United States Patent [19]
Harrison

[11] Patent Number: 5,517,429
[45] Date of Patent: May 14, 1996

[54] INTELLIGENT AREA MONITORING SYSTEM

[76] Inventor: Dana C. Harrison, 581 Tioga Ct., Sunnyvale, Calif. 94087

[21] Appl. No.: 880,754

[22] Filed: May 8, 1992

[51] Int. Cl.$^6$ .................................................. G01S 13/06
[52] U.S. Cl. ...................................... 364/516; 342/378
[58] Field of Search ................... 395/275, 93, 94, 395/132, 2; 364/516; 340/541, 568, 540, 506, 825.06; 342/378; 358/108

[56] References Cited

U.S. PATENT DOCUMENTS

| | | | |
|---|---|---|---|
| Re. 32,856 | 2/1989 | Millsap ........................... | 340/539 |
| 3,521,266 | 7/1970 | Montclair ........................ | 340/261 |
| 4,014,000 | 3/1977 | Takeshi et al. . | |
| 4,040,381 | 8/1977 | Keogh, Sr. et al. . | |
| 4,224,600 | 12/1980 | Sellner . | |
| 4,275,380 | 6/1981 | Gardner . | |
| 4,321,592 | 3/1982 | Crandall et al. ................ | 340/541 |
| 4,401,976 | 8/1983 | Stadelmayr ..................... | 340/522 |
| 4,422,068 | 12/1983 | Helft et al. ..................... | 340/514 |
| 4,523,185 | 6/1985 | Roth .............................. | 340/524 |
| 4,577,183 | 3/1986 | Fontaine et al. ............... | 340/541 |
| 4,613,848 | 9/1986 | Watkins ......................... | 340/541 |
| 4,622,538 | 11/1986 | Whynacht et al. .............. | 340/506 |
| 4,728,948 | 3/1988 | Fields .......................... | 340/825.06 |
| 4,731,859 | 3/1988 | Holter . | |
| 4,772,875 | 9/1988 | Maddox et al. ................. | 340/522 |
| 4,810,998 | 3/1989 | Hwaug ............................ | 340/541 |
| 4,831,539 | 5/1989 | Hagenbuch ....................... | 364/449 |
| 4,852,056 | 7/1989 | Rogers et al. ................... | 364/581 |
| 4,857,912 | 8/1989 | Everett, Jr. et al. .............. | 340/541 |
| 4,864,282 | 9/1989 | Toeg ............................. | 340/573 |
| 4,891,762 | 1/1990 | Chotiros ......................... | 364/456 |
| 4,926,161 | 5/1990 | Cupp ............................. | 340/572 |
| 4,962,473 | 10/1990 | Crain ............................ | 395/275 X |
| 5,018,215 | 5/1991 | Nasr et al. ...................... | 364/516 X |
| 5,036,474 | 7/1991 | Bhanu et al. .................... | 364/516 |
| 5,091,780 | 2/1992 | Pomerieau ........................ | 358/108 |
| 5,172,253 | 12/1992 | Lynne ............................ | 395/23 |

*Primary Examiner*—Emanuel T. Voeltz
*Assistant Examiner*—Thomas Peeso

[57] ABSTRACT

An intelligent area monitoring system having a plurality of sensors (11,12,13,14,15,16), a neural network computer (20), a data communications network (28,30,32,42), and multiple graphic display stations (40). The neural network computer (20) accepts the input signals from each sensor. Any changes that occur within a monitored area are communicated to system users as symbols which appear in context of a graphic rendering of the monitored area. The sensors can be active or passive. Each sensor provides an analog output (54). Codes are communicated to graphic display stations (40) via a data communications network (28,30,32,42). Based on these codes, the graphic display stations (40) select and place symbols on their display screens to accurately represent the identity and location of targets in the monitored area.

18 Claims, 7 Drawing Sheets

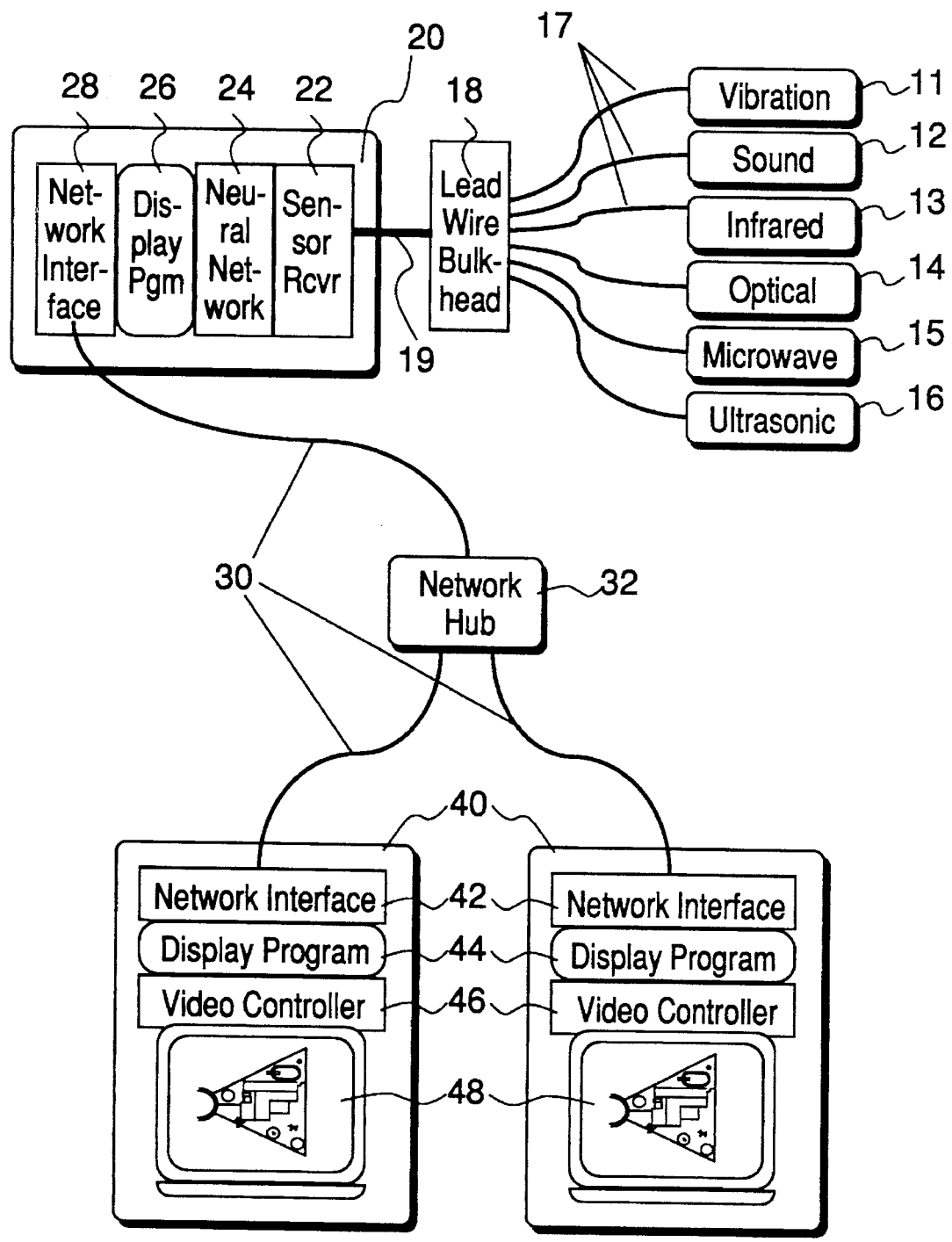

10

INTELLIGENT AREA MONITORING SYSTEM

FIELD OF INVENTION

This invention relates generally to the field of intrusion detectors and to the field of computer monitoring systems. More specifically, this invention employs neural network connection-based computing to monitor the location and identity of people, animals, and objects within an indoor or outdoor area for the purpose of intrusion detection, theft deterrence, and accident prevention. Patents in PTO Class 340 provide many examples of current state of the art in this area, with Subclasses 500 through 599 and Subclass 825 being most closely related to this invention.

BACKGROUND OF THE INVENTION

Heretofore, intrusion detection systems and property monitoring systems have only been able to provide binary on/off alert information to users. Even sophisticated systems which employ multiple sensors can only resolve an alert to a particular sector of the area under surveillance. Existing systems are not able to determine, and convey to system users, the precise location, identity, and movement of one or more intruders. This invention provides this capability and more, by combining analog and broadband sensors with the intelligence of a class of computer called a neural network, to bring about a fundamentally new type of intelligent area monitoring system.

The neural network computer uses a different principle to process information than does a traditional rule-based computer. The neural network is a connection-based computer, meaning that it processes information based on the connections between many small processors; as opposed to traditional computer processors which apply a sequence of rules to input information. The neural network processor works somewhat like a biological neural system in that it compares the inputs on each neuron to many other neurons, and formulates its output based on the aggregate of the inputs.

Neural network processors appear destined to dramatically expand the range of uses for computers. Many of the artificial intelligence applications that the computer industry has been striving in vain to achieve using rule-based computers, seem to come naturally to connection-based computers. Neural network processors not only facilitate a new generation of intrusion detection and computer monitoring systems, they allow commercial implementations of such systems to provide new functionality. Examples of new functionality include authentication of residents or employees by pattern matching their speech and optical images; speech recognition such that the system would alert another resident if someone were to call for help or cry; and behavior modeling so that the system would be able to issue an alert if someone were to fall in the shower, or a child were to walk toward the street.

The present invention employs multiple sensors of various types arrayed around the area to be monitored. Sensors are commercially available to detect sound, vibration, and emissions of various segments of the electromagnetic spectrum such as infrared, visual, and microwave. Prior art references of security assessment systems, intrusion detection systems, and computer monitoring systems, employ sensors with discrete outputs, usually binary, and thereby convey only on/off alert information to system users. U.S. Pat. No. 4,857,912 by Everett, Jr. et al., Aug. 15, 1989, discusses sensors that have "an on and off state". The present invention can provide useful information based on input from such binary sensors; however, a fundamentally new type of intelligent area monitoring is achieved when using the analog output sensors described above. Analysis of the analog data by the neural network computer allows this invention to not only detect the presence of people, animals, or objects; but to deduce their precise location at any instance. Additionally, the neural network is able to infer the identity of people, animals, or objects, and convey this to users of the monitoring system.

Sensors can be classified in terms of their energy source and their output signals. The simplest of these are passive sensors which detect energy either emitted or reflected by objects within their field of view. Active sensors emit their own energy which is bounced back to the sensor from the objects within their field of view. The present invention is quite effective with passive sensors, active sensors, or a combination of the two types.

One of the shortcomings of existing intrusion detection systems is their propensity to give false alarms. Existing systems use rule-based algorithms to determine if an alert should be issued. Common commercial burglar alarms for home and business issue an alert if any sensor on the property exceeds a threshold value. More sophisticated systems, such as that described by Everett, Jr. et al., in U.S. Pat. No. 4,857,912, employ a two stage processing scheme whereby the "on" signals from multiple sensors are added together, and an overall alert is issued when the sum exceeds a threshold value. Even elaborate rule-based systems are typically unable to reduce false alarms to an acceptable level because the variability encountered even in nominal environments exceeds the logic of these systems.

The present invention does not suffer from these shortcomings because it is based on an entirely different principle than rule-based systems. Connection-based systems not only accommodate a much wider range of variability, but improve their accuracy and discrimination with regular use. More importantly however, this invention does not merely issue alerts, but displays the exact location of one or more intruders in a graphic image of the monitored area. This allows the user to understand exactly what has caused the alert, and thereby qualify whether the situation warrants a particular level of alert. The user can then correct the system if necessary so that subsequent similar situations will be correctly interpreted by the system.

SUMMARY OF THE INVENTION

The present invention provides a multiple sensor system with intelligent sensor signal analysis and intuitive graphic display for the detection, identification, location, and movement tracking of one or more people, animals, or objects within a predetermined area. This invention offers a fundamentally new concept of intelligent area monitoring by providing identity, location, and movement information to system users before, during, and after an alert. Additionally, the present invention provides alerts which are more accurate and flexible than those available from the prior art. The present invention is also unique in its ability to improve its accuracy with use.

In accordance with the area monitoring system of the present invention, multiple sensors are placed around the area to be monitored such that all points within the area are viewed by three or more sensors. Placement of individual sensors is not critical because the system is self-calibrating. The sensors can be all of a single class, such as infrared, optical, motion, sound, etc.; or they may be a mix of many different classes to improve the system's range, discrimination, accuracy, and tolerance to deception. Though discrete output sensors can be used, the present invention is best expressed when the sensors employed provide an analog output.

The present invention provides an independent channel for each sensor to carry its signal back to a neural network computer. The neural network computer compares the signals from all sensors and organizes its internal connections during a training phase to form a virtual model of the monitored area. Unlike prior art systems such as the Security Assessment System described by Everett, Jr. et al. in U.S. Pat. No. 4,857,912, the present invention learns the permanent topograhy of its environment from which it can resolve changes, such as an intruder. In this way, the present invention functions in a manner similar to the compound eye of a fly; where each facet has poor visual resolution, but the interrelationship of inputs from all facets on the fly's eye allows an accurate visual model to be resolved in the fly's brain.

Because the present invention is able to resolve a model of the monitored area, it is then able to determine if anything changes within the model. The present invention can detect changes such as a table falling or a car rolling down the driveway, a person or animal entering the monitored area, or a person or animal moving within the monitored area. The present invention can estimate the identity of new objects and assign them to an object class such as "large person", "small animal", "automobile", etc.

The present invention is able to provide these unique capabilities because of the granularity of the information collected from the analog sensors, and the ability for the neural network computer to quickly recognize patterns and infer the cause of any change within the aggregate signal array. In this way, the neural network computer converts the abstract array of sensor signals to a meaningful set of relationships and inferences. The neural network computer is able to determine the location of a person by comparing the composite sensor signal pattern to patterns for known positions, and then extrapolating between the closest location matches.

Identity determination utilizes similar attributes of the neural network computer. The signals from those sensors which are receiving energy from the target are compared to energy patterns of known object classes to determine the type of object. Many different energy types can be used in this analysis including infrared, sound, and optical.

The neural network computer provides an output comprised of patterns of activation energies across different groups of many neural units corresponding to the location, identity, and status of the target object. The activation energy levels from all output neural units are directed to a rule-based software program running on a traditional microprocessor within the neural network computer which converts the patterns to particular attribute codes. An example attribute code might be the (x,y) location coordinates of a particular target within the monitored area. Changes to these attribute codes are transmitted over a local area network from the neural network computer to one or more graphic display stations.

The graphic display stations provide the user interface to the area monitoring system. The graphic display program selects the graphic symbol or icon which corresponds to the identity attribute code. It then places this icon on a rendering of the area in the position corresponding to the location attribute code. The status attribute code is constantly evaluated to determine if an alert should be issued. The status attribute code also conveys the level of alert and the object or objects for which the alert is issued.

Users of the present invention interact with the area monitoring system via the graphic display stations. The graphic display stations can be traditional rule-based microcomputers, such as current laptop or even palmtop models. These stations display a 2 or 3 dimensional scale drawing of the monitored area and all of its permanent fixtures. They must have display resolution capable of rendering sufficient detail of the monitored area. Color displays are not necessary, but can be used to advantage to differentiate alert levels and provide easily recognizable symbols. Output from the system is conveyed on the station's display screen as symbols indicating the identity of particular targets in their correct location with respect to a rendering of the permanent features of the monitored area. Users train the area monitoring system and provide correctional input via the graphic display stations by moving symbols to their actual location on the area rendering, or selecting another symbol which more accurately represents the target.

OBJECTS OF THE INVENTION

Accordingly, a primary object of the present invention is an area monitoring system which can detect, locate, and identify people, animals, and inanimate objects within said area, and can communicate the location and identity of said people, animals, and objects to users of said system by placing intuitive symbols in context of a computer generated scale rendering of said area.

A further object of this invention is an area monitoring system which can infer various levels of alerts corresponding to the urgency or danger of the monitored events and communicate said alerts to users of said system.

A further object of this invention is an area monitoring system which can simultaneously recognize and display the location, identity, and movement of multiple people, animals, and objects.

A further object of this invention is an area monitoring system which can display the current location and movement of an intruder prior to an alert, during an alert, and after an alert.

A further object of this invention is an area monitoring system which can continue to provide location and movement information to users of said system regardless of attempts to disable the system by destroying individual sensors or by disconnecting sensor lead wires.

Another object of this invention is an area monitoring system that is capable of learning the dimensions, fixtures, and objects of said area, and is capable of learning the identities of the resident people and animals.

BRIEF DESCRIPTION OF THE DRAWINGS

FIG. 1 is a schematic diagram of the intelligent area monitoring system of the present invention.

DESCRIPTION OF THE PREFERRED EMBODIMENT

Figure 2A:
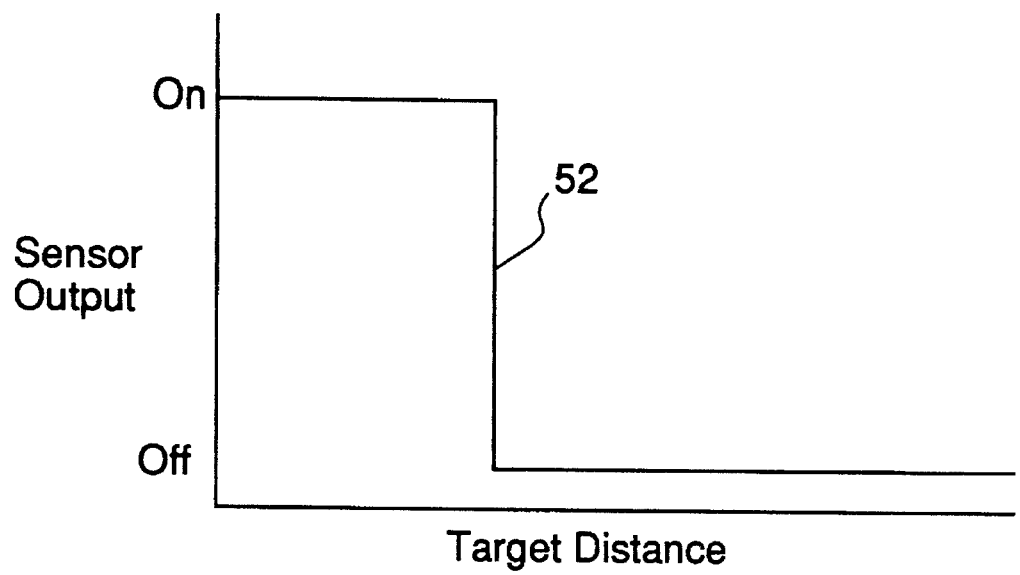
FIG. 2A is a graph of the output signal from a binary output sensor varied by target distance.

I will use a personal family residence as an example to describe the preferred embodiment of the present invention. However, the present invention is in no way limited to this example application, and the area to be monitored can range from a single indoor room to a large outdoor area comprising many square miles.

Referring to FIG. 1, the components of the intelligent area monitoring system of the present invention will now be described. A plurality of sensors 11,12,13,14,15,16, are placed throughout the area to be monitored. Sensor placement is determined by the field of view and range of the particular sensors so that all points within the area to be monitored are covered by three or more sensors. The sensors can all employ the same method of detection, such as infrared 13, or they may be a mix of sensors using different detection methods, such as vibration 11, sound 12, infrared 13, optical 14, microwave 15, and ultrasonic 16. The function of these sensors is well known and will not be described here.

Figure 2B:
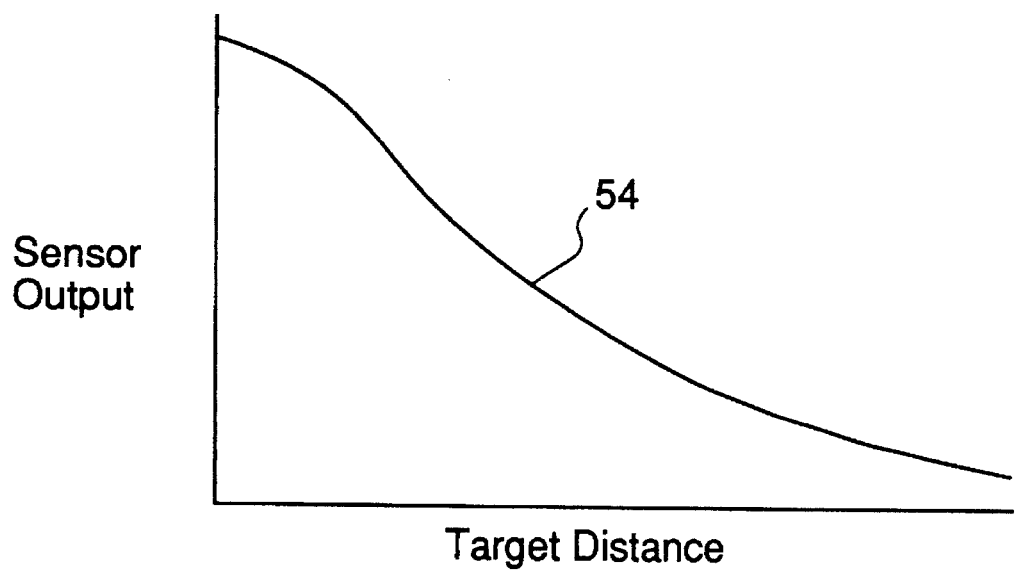
FIG. 2B is a graph of the output signal from an analog output sensor varied by target distance.
Figure 3A:
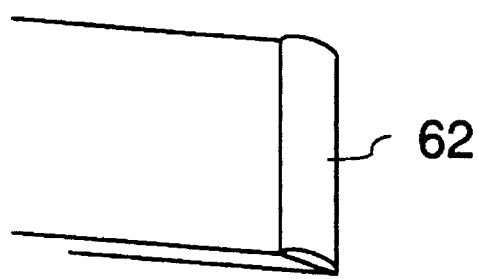
FIGS. 3A, 3B, 3C, 3D are four diagrams illustrating various options for sensor placement for use with the present invention.
Figure 3B:
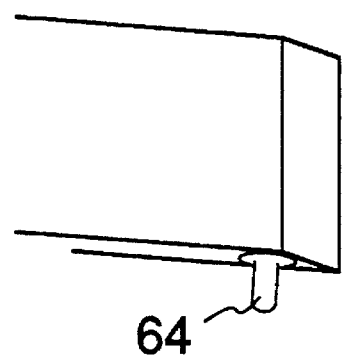
Figure 3C:
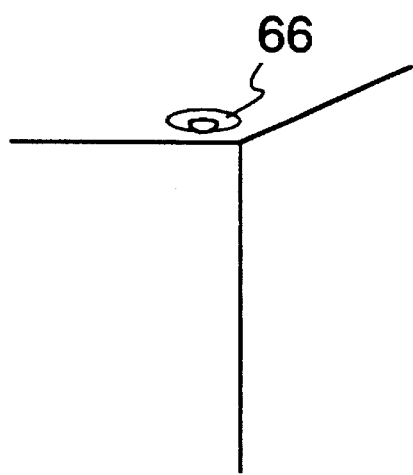
Figure 3D:
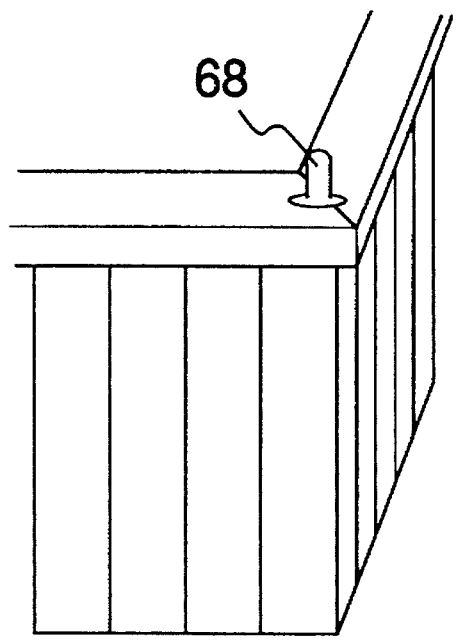

Referring to FIG. 2A and FIG. 2B, unlike the security assessment system described by Everett, Jr. et al. in column 6, lines 42 through 48 of U.S. Pat. No. 4,857,912 which relies on sensors providing binary "on" or "off" output 52, the preferred embodiment of the area monitoring system of the present invention uses sensors which provide an analog output 54 proportional to the magnitude of the target energy they are receiving. The present invention supports both passive and active analog output sensors, which are described above in the Background of the Invention section.

Referring to FIG. 3A, FIG. 3B, FIG. 3C, and FIG. 3D, individual sensors are mounted on permanent fixed objects throughout the area to be monitored. For outdoor monitoring, sensors can be attached to beam ends 62,64 along the roof eves of a building, to the tops of walls and fences 68, to trees, and directly to the ground. Indoor monitoring is accomplished by attaching sensors to ceilings 66, walls, and fixtures. Again, sensor placement must provide overlap of sensor fields such that all points within the area to be monitored are covered by three or more sensors. The range and field of view of current sensor technology provides adequate coverage for a typical family residence with 30 to 60 sensors.

As depicted in FIG. 1, sensor lead-wires 17 are connected from each sensor 11, 12, 13, 14, 15, 16, to the sensor lead-wire bulkhead 18. Each sensor lead-wire typically contains two conductors. The sensor lead-wire bulkhead 18 passes each sensor signal to the sensor receiver circuit board 22 of the neural network computer 20 via a ribbon cable 19. The neural network computer 20 is constructed using a workstation class microcomputer comprised of a power supply, motherboard, central processing unit, operating system, and bus for add-in hardware. The neural network computer 20 contains four functional components which are key to the present invention; the sensor receiver unit 22, the neural network processor 24, the graphic display server 26, and the data network interface 28.

Figure 4:
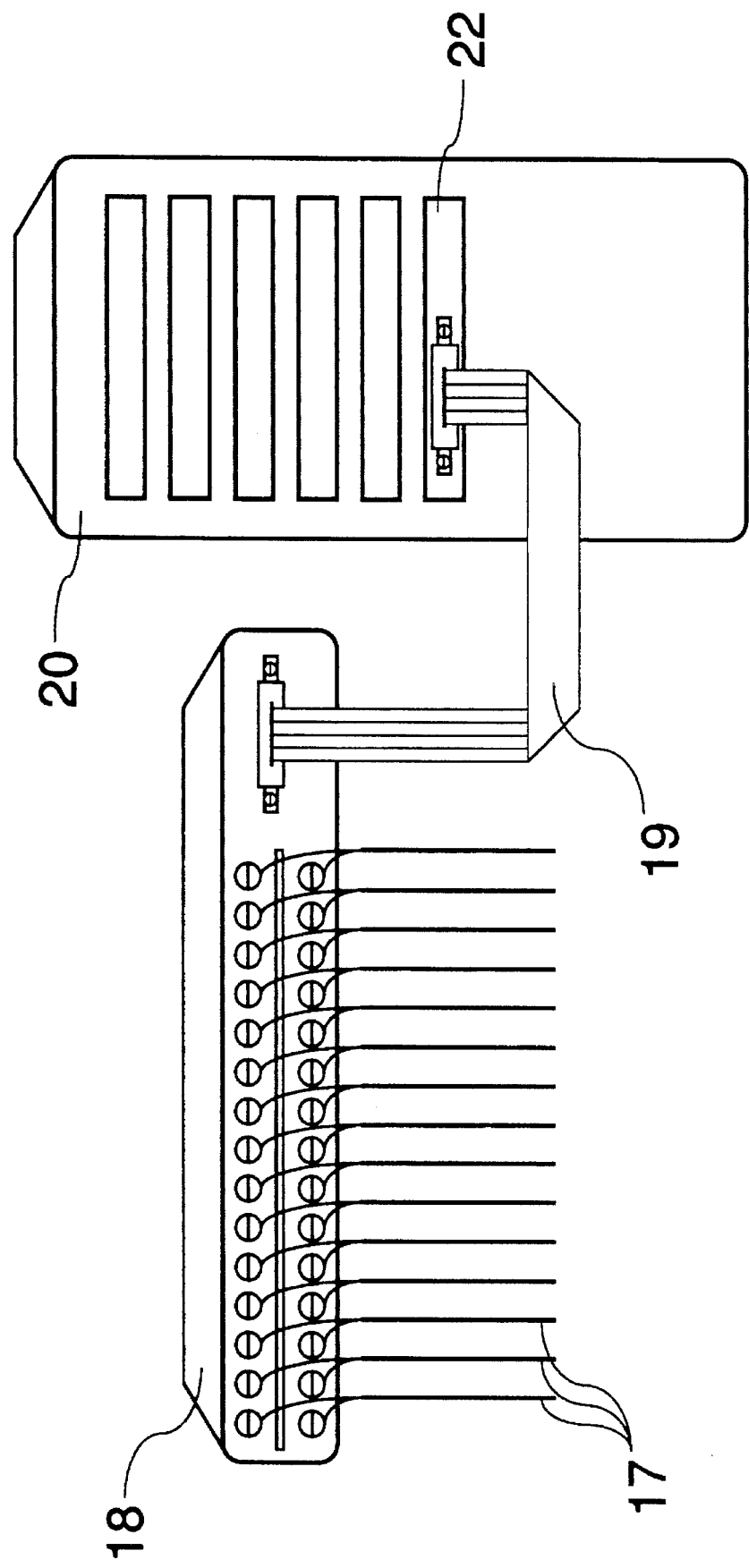
FIG. 4 is a drawing illustrating the attachment between the sensor lead-wire bulkhead and the neural network computer.

As depicted in FIG. 4, the sensor lead-wire bulkhead 18 is a separate chassis which provides an independent connector for each sensor lead-wire pair 17. The input signal from each sensor is maintained as a separate channel and is passed to the sensor receiver circuit board 22 via a multi-line ribbon cable 19. The sensor receiver circuit board connects to the hardware bus of the neural network computer 20. This input signal is typically a direct current potential difference between the sensor lead-wire conductors ranging from millivolts to a few volts.

Figure 5:
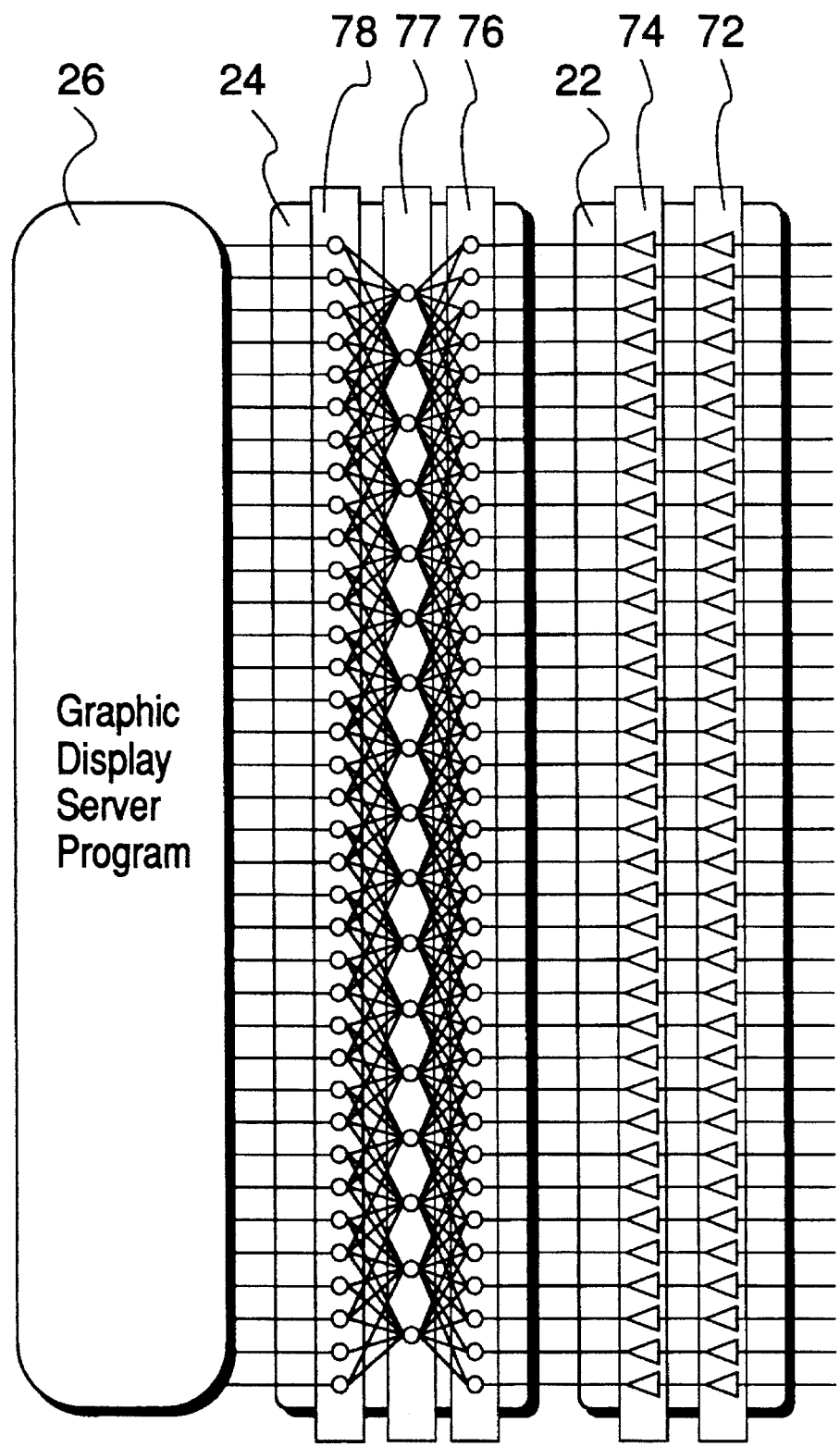
FIG. 5 is a schematic diagram of the key components of the neural network computer used in the present invention.

As depicted in FIG. 5, the sensor receiver unit 22 is comprised of a plurality of amplification circuits 74 and optional encoder circuits 72 in series. One amplifier and encoder can be used for each sensor input signal. The sensor receiver unit 22 can be implemented on an add-in circuit board designed for the hardware bus of the neural network computer FIG. 4, number 20. If the analog sensor signals are encoded in the sensor receiver unit 22, the digitized signals can be passed to the neural network processor 24 via the hardware bus of the neural network computer FIG. 4, number 20. If an analog neural network processor is used, the sensor signals are not encoded, and a separate ribbon cable bus is used to convey the analog sensor signals from the sensor receiver 22 circuit board to the neural network processor 24 circuit board.

Again referring to FIG. 5, each output signal from the sensor receiver 22 is connected to a separate neural unit in the input layer 76 of the neural network processor 24. The neural network processor 24 can be implemented on an add-in circuit board designed for the hardware bus of the neural network computer FIG. 4, number 20. Neural network technology is well known and will not be fully described here. For purpose of example, a three layer, fully interconnected Back-Error Propagation neural network design is used, as this type of network has demonstrated the pattern recognition and training characteristics required for the present invention. The term "fully interconnected" means that each neural unit in one layer is connected to every neural unit in adjacent layers. The present invention is in no way limited to a particular neural network design, and other designs from this emerging technology would be entirely appropriate.

Again referring to FIG. 5, a layer of input neural units 76 accepts the signals from the sensor receiver 22. Each input neural unit accepts the signal from one sensor. The input neural units are fully interconnected with a second layer of neural units 77 which are called hidden units because their inputs and outputs are not visible outside the neural network. These hidden units are also referred to as feature detectors because they organize themselves during training to respond to specific features in the input pattern. These hidden neural units are fully interconnected with a layer of output neural units 78.

Each neural unit in the hidden and output layers 77,78 sums the inputs from all of the neural units in the preceding layer. The neural unit then calculates its activation level by applying a sigmoid function to the input sum. This activation level is output to all neural units in the following layer. Weights are assigned to each interconnection between the input neural units 76 and the hidden neural units 77, and to each interconnection between the hidden neural units 77 and the output neural units 78. These weights are adjusted during training to cause the output from the network to become more accurate with each training iteration. This adjustment is accomplished by propagating an error reducing calculation back through each successive layer of neural units.

The neural network compares the inputs from all sensors and reduces the incoming signal information to particular activation level patterns in the output neural units. In this example, the output neural units responsible for indicating the target location are logically arranged in a two dimensional matrix which corresponds to the area to be monitored. The neural network of the present invention can be scaled up to provide the target location within a 3 dimensional space by assigning additional neural units to represent the z dimension. The number of output neural units dedicated to this matrix is a function of the resolution desired in locating the target. To resolve a target in two dimensions to within one square meter on a typical 0.3 acre residential property, 800 to 1000 output neural units are required. More efficient organizations of the output neural units may be used to reduce this number, such as having a set of eight neural units represent a binary code for the x coordinate, and another set of eight neural units represent the y coordinate of particular target.

The identity of the target can be provided by the same neural units which are responsible for target location. This is accomplished by using the magnitude of the neural unit's activation energy level to represent target identity. In this example, target identity might simply be the relative size of the target. There might be 3 sizes; small, medium, and large. This relative size is determined by the magnitude of the activation energy level of the neural unit which is indicating a target. If greater granularity is required in the identification, such as distinguishing a person from an animal, more neural units must be allocated to the identification task.

Additional output neural units are used to code for error conditions in the monitoring system, such as a sensor failure; or for alert conditions where, for example, an audible tone might be sounded at the graphic display stations 40 anytime a target enters the pool area.

As depicted in FIG. 1, the activation levels of the output neural units are passed to the graphic display server program 26 via the hardware bus of the neural network computer 20 which is described above. The graphic display server program 26 runs in the operating system of the neural network computer 20 on a traditional rule-based microprocessor. The software programming required to construct the graphic display server is well known and will not be described here. The graphic display server program 26 continually polls the output neural units for their activation values.

Figure 7:
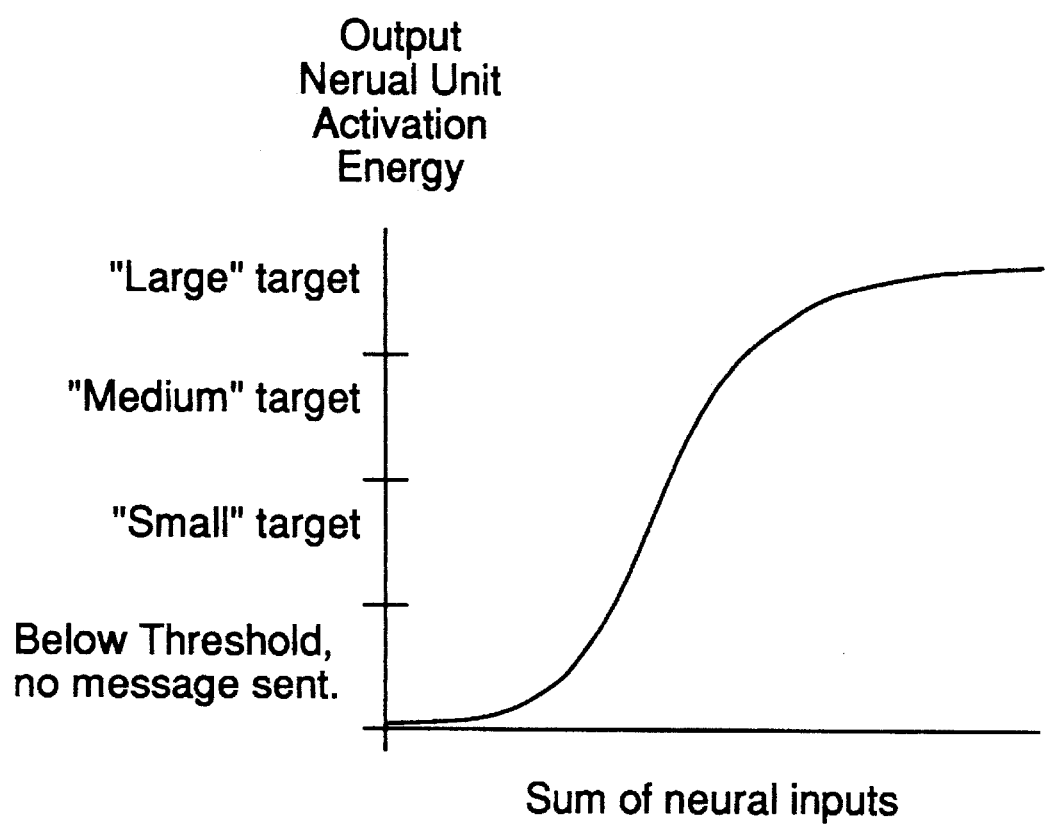
FIG. 7 is a graph of the activation energy of an output neural unit varied by the sum of input energy received, used to indicate target size.

As depicted in FIG. 7, a sigmoid function is applied to the sum of the inputs from all neural units in the preceding layer to arrive at the activation energy value for each output neural unit. Now referring to FIG. 1, the activation energy values for all output neural units are sent to the graphic display server program 26. If none of the activation energy values of the output neural units exceeds a predefined threshold, then the graphic display server program 26 will not send any message over the local area network 28,30,32,42 to the graphic display stations 40. When the activation level of one or more output neural units exceeds this threshold, the graphic display server program 26 determines the identity of each target by comparing the activation level of each neural unit above the threshold, to the activation value ranges established for "small", "medium", and "large" targets. The graphic display server program 26 then formulates a message to be broadcast over the local area network 28,30,32,42 to all graphic display stations 40. This message contains codes for the location and identity of each target identified by the system.

The graphic display stations 40 are standard laptop or palmtop microcomputers having sufficient screen resolution to acceptably render the area to be monitored. The display stations contain a data network interface 42 and the graphic display client program 44. The graphic display client program 44 provides input to the stations video controller 46 based on the symbol code and display coordinates it receives from the display server 26 via the data network 28,30,32,42. The video controller 46 controls the image on video display screen 48. The graphic display stations 40 convert the data into user alerts and indicate the location and identity of any object on the property. It is through the graphic display stations that users provide feedback to the system to improve its accuracy and to personalize the system for their particular needs.

Figure 6:
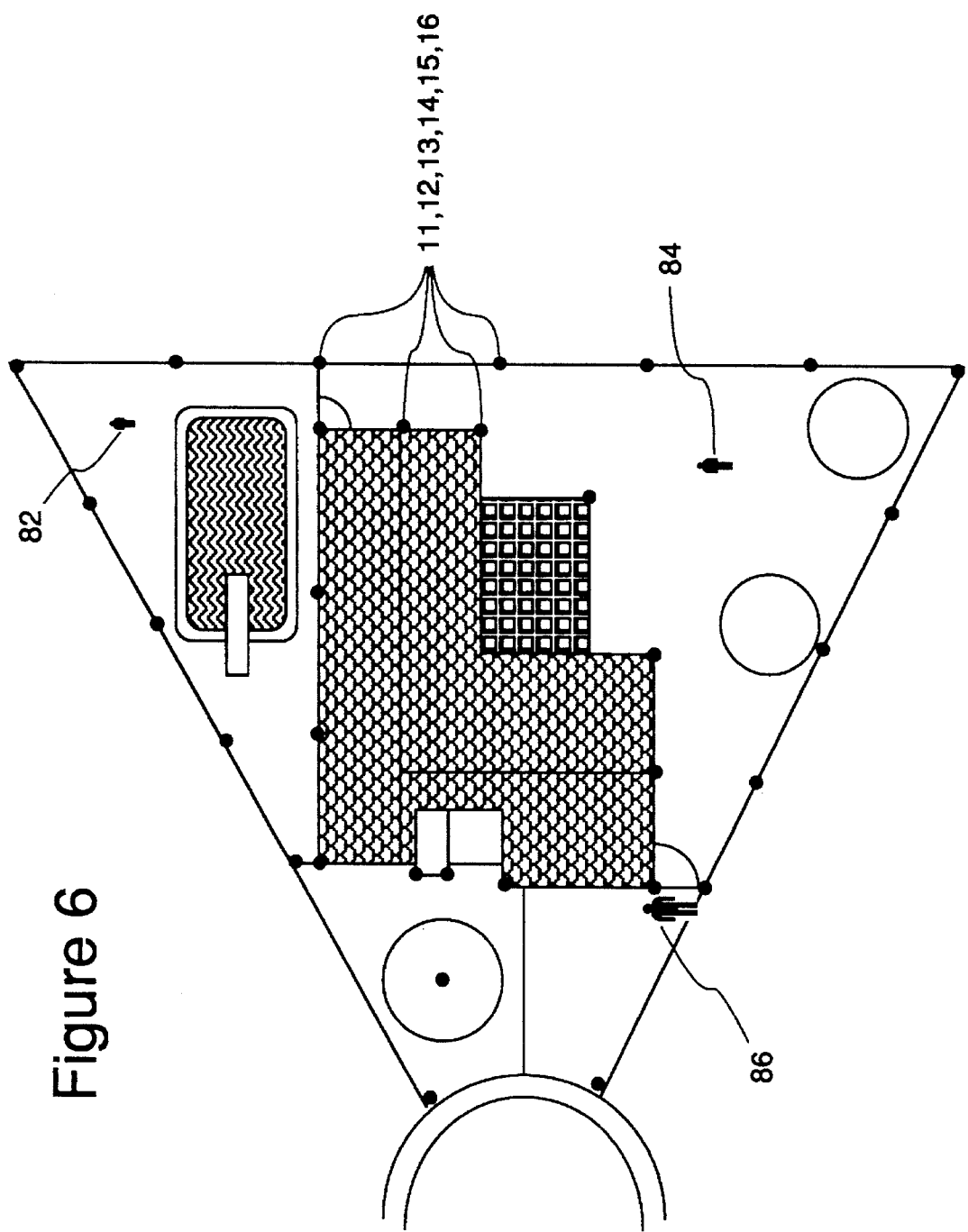
FIG. 6 is an example rendering which would appear on the screen of the graphic display station.

The graphic display stations 40 receive the messages sent from the graphic display server program 26 via their local area network interface 42. Messages are sent only when something needs to be changed on the display of the graphic display stations 40. The messages contain codes for the identity and location coordinates of each target identified by the neural network processor. The graphic display client program 44 processes the codes contained in the message and places the appropriate symbols as depicted in FIG. 6, numbers 82,84,86, in the indicated locations on the display screen. A typical message might contain the instruction to turn off the symbol indicating a large target at location (x,y), and turn on the symbol indicating a large target at location (x,y+1). Multiple instructions can be contained in a single message.

The graphic display client program 44 is responsible for generating a two or three dimensional rendering of the monitored area as depicted in FIG. 6. The graphic display client program 44 provides drawing tools to assist the user in creating an accurate rendering of the area to be monitored. FIG. 6 depicts a graphic display station screen showing a two dimensional rendering of a family residence. In this example, 3 objects have been detected, located, and identified. They include a small target 82 in the pool area, a medium target 84 in the backyard, and a large target 86 at the side gate.

I claim:

1. A system for monitoring a space comprising:

a plurality of sensors;

a neural network simultaneously responsive to all of the sensors for creating a model of the space and objects within the field of view of the sensors and for providing an output corresponding to changes within the space; and means responsive to the neural network output for indicating the changes.

2. System according to claim 1 wherein each of said sensors comprises means for providing an analog output.

3. System according to claim 1 wherein each of said sensors comprises means for providing a binary output.

4. System according to claim 1 wherein each of said sensors comprises means for providing a broadband output.

5. System according to claim 1 wherein at least one of said sensors is responsive to infrared energy.

6. System according to claim 1 wherein at least one of said sensors is responsive to optical energy.

7. System according to claim 1 wherein at least one of said sensors is responsive to microwave energy.

8. System according to claim 1 wherein at least one of said sensors is responsive to sound energy.

9. System according to claim 1 wherein at least one of said sensors is responsive to ultrasonic energy.

10. System according to claim 1 wherein said neural network provides an output corresponding to a plurality of simultaneous changes among multiple independent targets within the space.

11. System according to claim 1 wherein said neural network provides an output corresponding to the identity of an object within the space.

12. System according to claim 1 wherein said neural network provides a predetermined alert when one or more defined changes occur within the space.

13. System according to claim 1 wherein said neural network provides an output corresponding simultaneously to the location and identity of an object within the space.

14. A system for monitoring a space comprising:

a plurality of sensors;

a neural network simultaneously responsive to the output of all of the sensors for creating a model of the space and objects within the field of view of the sensors and for providing an output corresponding to a plurality of simultaneous changes among multiple independent targets within the space; and means responsive to the neural network output for indicating the changes.

15. A system for monitoring a space comprising:

a plurality of sensors;

a neural network simultaneously responsive to the output of all of the sensors for creating a model of the space and objects within the field of view of the sensors and for providing an output corresponding to the identity of and a plurality of simultaneous changes among the objects within the space; and means responsive to the neural network output for indicating the identity and changes among the objects in the space.

16. A system for monitoring a space comprising:

a plurality of sensors;

a neural network simultaneously responsive to the output of all of the sensors for creating a model of the space and objects within the field of view of the sensors and for providing an output corresponding to a plurality of simultaneous changes among the objects within the space; and means responsive to the neural network output for indicating the changes and providing alerts in response thereto.

17. A system according to claim 16 wherein said neural network provides said alerts when one or more changes occur within the space which exceed previously observed behavorial norms.

18. A system for monitoring a space comprising:

a plurality of sensors;

a neural network simultaneously responsive to the output of all of the sensors for creating a model of the space and objects within the field of view of the sensors and for providing an output corresponding to the identity and location of and a plurality of simultaneous changes among the objects within the space; and means responsive to the neural network output for indicating the identity, location and changes among the objects within the space.

* * * * *